United States Patent
Messant et al.

(10) Patent No.: US 9,309,418 B2
(45) Date of Patent: Apr. 12, 2016

(54) PAINT, IN PARTICULAR FOR TEMPORARY ROAD MARKINGS, CONTAINING BIODEGRADABLE POLYMERS

(71) Applicants: Gerard Messant, Saint-Maur-des-Fosses (FR); Yves Ortais, Gemenos (FR)

(72) Inventors: Gerard Messant, Saint-Maur-des-Fosses (FR); Yves Ortais, Gemenos (FR)

(73) Assignees: GM AGRI, Villemurlin (FR); INVENTIVE HOLDING, Gemenos (FR)

( * ) Notice: Subject to any disclaimer, the term of this patent is extended or adjusted under 35 U.S.C. 154(b) by 0 days.

(21) Appl. No.: 14/347,112

(22) PCT Filed: Oct. 10, 2012

(86) PCT No.: PCT/FR2012/052301
§ 371 (c)(1),
(2) Date: Mar. 25, 2014

(87) PCT Pub. No.: WO2013/054040
PCT Pub. Date: Apr. 18, 2013

(65) Prior Publication Data
US 2014/0228270 A1    Aug. 14, 2014

(30) Foreign Application Priority Data

Oct. 11, 2011    (FR) ...................... 11 59192

(51) Int. Cl.

| C09D 167/08 | (2006.01) |
|---|---|
| C09D 9/04 | (2006.01) |
| C09D 131/00 | (2006.01) |
| C09D 163/00 | (2006.01) |
| C09D 167/00 | (2006.01) |
| C09D 133/08 | (2006.01) |
| C09D 5/33 | (2006.01) |
| C09D 5/00 | (2006.01) |
| E01F 9/04 | (2006.01) |
| C11D 1/66 | (2006.01) |
| C11D 3/22 | (2006.01) |
| C11D 11/00 | (2006.01) |

(52) U.S. Cl.
CPC  *C09D 9/04* (2013.01); *C09D 5/004* (2013.01); *C09D 5/008* (2013.01); *C09D 131/00* (2013.01); *C09D 133/08* (2013.01); *C09D 163/00* (2013.01); *C09D 167/00* (2013.01); *C09D 167/08* (2013.01); *C11D 1/662* (2013.01); *C11D 3/221* (2013.01); *C11D 11/0023* (2013.01); *E01F 9/04* (2013.01)

(58) Field of Classification Search
CPC .. C09D 133/08; C09D 167/00; C09D 163/00; C09D 131/00
See application file for complete search history.

(56) References Cited

U.S. PATENT DOCUMENTS

| 2,933,989 A | 4/1960 | Duval | |
|---|---|---|---|
| 3,337,483 A | 8/1967 | Edwin et al. | |
| 3,523,029 A | 8/1970 | Edwin et al. | |
| 2003/0212182 A1* | 11/2003 | Kayima et al. | 524/457 |
| 2011/0207850 A1* | 8/2011 | Kan et al. | 523/402 |
| 2012/0201210 A1* | 8/2012 | An et al. | 370/329 |
| 2012/0244288 A1* | 9/2012 | Young et al. | 427/385.5 |
| 2012/0270055 A1* | 10/2012 | Sheng et al. | 428/414 |

FOREIGN PATENT DOCUMENTS

| EP | 2135886 A1 | 12/2009 |
|---|---|---|
| FR | 2221502 A1 | 10/1974 |
| FR | 2951730 A1 | 4/2011 |
| WO | 2008076360 A2 | 6/2008 |
| WO | 2011051612 A1 | 5/2011 |

OTHER PUBLICATIONS

English Language Maching Translation of WO2011/051612.*
Road marking materials—Road marking performance for road users', standard NF EN 1436+A1 (Mar. 2009).
"Road marking products—Road trials", standard NF EN 1824 (Feb. 1999).
"Horizontal road marking products", AFNOR Certification, NF331, revision No. 1, application date: Sep. 15, 2005.

* cited by examiner

*Primary Examiner* — Gregory R Delcotto
(74) *Attorney, Agent, or Firm* — Ladas & Parry LLP

(57) ABSTRACT

The invention relates to removable temporary paint having a release agent including a non-ionic surfactant and having a pH of 3 to 6. The paint includes: 10 wt % to 50 wt % of a natural alkyd resin in an aqueous emulsion, the alkyd resin having a molar mass Mp of 3,000 g/mol to 100,000 g/mol, a polydispersity index lp of 1 to 20, an oil length of 20% to 40%, and an acid index of 10 to 35; at least one inorganic filler and/or pigment; and a sufficient amount of water. The paint can be used as eco-friendly road paint for temporary markings.

16 Claims, No Drawings

PAINT, IN PARTICULAR FOR TEMPORARY ROAD MARKINGS, CONTAINING BIODEGRADABLE POLYMERS

This application is a 371 of PCT/FR2012/052301, filed on Oct. 10, 2012, which claims priority to French Application No. 1159192, filed Oct. 11, 2011.

TECHNICAL FIELD OF THE INVENTION

The invention relates to paints, and more specifically the field of paints for temporary road markings, i.e. paints used in particular for temporarily defining lines traffic lines and zones, parking areas, pedestrian crosswalks and intersections. These paints are commonly called "road paints".

PRIOR ART

Two different types of road paints are distinguished, each corresponding to a different end use: permanent road paints, and temporary road paints. The first must be as durable as possible, the second must be capable of being easily removed or erased while having sufficient mechanical and chemical durability during the period of desired use, for example during a period of road work. These compositions can be applied by different techniques, for example painting with a paintbrush or a roller or hot spraying or solvent spraying. The product applied to the road surface can then be air-dried. A thermoplastic composition that hardens by cooling can also be applied.

In general, it is desirable for road paints not to contain environmentally toxic products and preferably even to be biodegradable, because these paints or at least their constituents or degradation products will sooner or later become part of the environment. This is the case in particular for temporary road paints, which are generally removed using a liquid product that dissolves them and that will end up being swept away either into the wastewater drainage system or into nature. An alternative for permanent road paints consists of adhesive films, the durability of which is sometimes a limiting element, in particular because they are not resistant to the shear forces exerted by tires. It is also possible to burn permanent paints using a torch, but this is not suitable for large surfaces and requires a significant amount of labor. It goes without saying that if the temporary paint is removed by rinsing, not only the road paint itself (as well as the constituents and degradation products thereof) but also the rinsing product must be non-toxic and preferably biodegradable.

These paints must also satisfy other well-known criteria, and in particular their drying time must be minimal so as not to cause a prolonged closure of the road after their liquid application. They must also be compatible with a multitude of different road coatings, in particular the various types of road tar or asphalt used throughout the world, as well as with cements and concretes used for this purpose. After their application, they must be resistant to abrasion, rain, cold, salt and other organic solvents (gasoline, diesel fuel, oil, glycols) and other liquid products commonly used that may accidentally spread over the road. In addition, they must enable various agents to be incorporated, which are intended to give them specific properties, such as coloring agents and reflective agents, agents improving their abrasion resistance and hardening agents.

The performance of road paints must satisfy the standards in force in the country where they are used, for example, standard NF EN 1436+A1 (March 2009) "Road marking materials—Road marking performance for road users", standard NF EN 1824 (February 1999) "Road marking products—Road trials" and the Reference for Certification "Horizontal road marking products" published by AFNOR Certification (identification no.: NF331, revision no.: 1, application date: Sep. 15, 2005).

In general, these paints can be single-component or two-component paints. They typically comprise a resin or wax base, a mineral filler intended to reinforce their mechanical resistance (in particular to abrasion) and a coloring filler (typically pigments).

U.S. Pat. No. 2,933,989 (V. Duval d'Adrian) describes a road paint based on waxes and resins derived from natural substances (colophony, hydrogenated castor oil, copal resin, dammar). As these products have low resistance to ultraviolet light, U.S. Pat. No. 3,337,483 (Cataphote Crop.) proposes a composition based on alkylcellulose and a resin obtained by copolymerization of styrene with an ester; this composition contains petroleum products. Similarly, U.S. Pat. No. 3,523,029 (Cataphote Corp.) proposes another composition comprising colophony-derived acids.

Patent application FR 2 221 502 (Sumitomo Chemical Co.) describes a thermoplastic composition for road marking comprising a synthetic resin (such as petroleum resins, melanin resins, phthalic resins, phenolic resins, epoxy resins) or natural resin (such as colophony); this composition contains petroleum products.

Patent application WO 2008/076360 (Reichhold, Inc.) describes a composition for road marking including an aqueous emulsion rich in solid elements of an alkyd resin derived from a natural oil, and a surfactant system comprised of a nonionic surfactant and an ionic surfactant. This alkyd resin can be a copolymer with an acryl and/or styrene unit. The resin described here consists in part of a phthalic anhydride, which is harmful to the environment.

In general, other compositions of resins of natural origin are also known, for example that described in patent application EP 2 135 886-A1 (Colas and Valagro), which is based on derivatives of an oil or fat of natural origin including monoglycerides and/or triglycerides, esterified by a poly(hydroxy acid). This product has not been envisaged as a paint base.

The alkyd resin described in patent application FR 2 951 730 (Centre National de le Recherche Scientifique and D.V.I Lab) has been envisaged as a surface coating base, including as a base in a road marking paint. The resin described in this patent application is intrinsically biodegradable and exclusively comprised of products of natural and in particular plant origin. However, this document does not describe a biodegradable composition for road marking paint comprised entirely of products of natural origin.

Moreover, none of the documents mentioned above indicates a method or product enabling the paint to easily be removed when it is used for temporary marking, for example during work.

Thus, the problem to be solved by the present invention is that of proposing a new single-component road marking paint composition that satisfies all of the functional criteria for road paints normally used (in particular in terms of abrasion resistance), and based on organic components (resins) of natural origin, i.e. available in the form of natural products or capable of being easily synthesized using natural and biodegradable products, in the form of nontoxic products, the dispersion of which occurs in an aqueous base, and drying quickly in air, and releasing few volatile organic compounds (VOC), and capable of being removed by aspersion and rinsing with a biodegradable and nontoxic liquid.

OBJECTS OF THE INVENTION

According to the invention, the problem is solved by a temporary paint composition detachable with a detachment agent including a nonionic surfactant and having a pH of between 3 and 6, characterized in that said paint includes:

10 to 50% (and preferably 20 to 40%) by mass of an alkyd resin of natural origin in an aqueous emulsion, said alkyd resin having a molar mass $M_p$ of between 3000 g/mol and 100,000 g/mol, a polydispersity index $I_p$ of between 1 and 20, an oil length of between 20 and 40%, and an acid index of between 10 and 35;

at least one mineral filler and/or pigment;

water quantum satis, preferably at least 10% (and even more preferably at least 15%) by mass.

Preferably, the organic constituents of said road paint are at least 97% by mass, and preferably at least 98% by mass, of natural origin.

In a specific embodiment, the acid index of said alkyd resin is between 16 and 35, preferably between 18 and 35 and even more preferably between 18 and 30.

The mineral filler and/or pigment content is advantageously between 20% and 60% by mass.

Said paint can also include 0.1 to 1.5% by mass of an animal protein, preferably casein, and 0.1 to 0.2% caustic soda. It can also include 0.1 to 1% by mass of a thickening agent, preferably cellulose ether, and/or 0.1 to 1% (and preferably 0.2 to 0.5%) by mass of a biocidal agent, preferably of plant origin, and/or 0.1 to 1% (and preferably 0.5 to 1%) by mass of a wetting agent, preferably sodium polyphosphate, and/or 0.1 to 1% by mass of at least one drying agent, preferably an organometallic iron salt.

Said paint advantageously contains an emulsifying agent, in an amount of 0.5% to 5% by mass, which can advantageously be chosen from the group formed by gum arabic, modified starches, animal proteins, and β-cyclodextrin.

The mineral fillers and pigments are advantageously chosen from the group consisting of calcium carbonate, kaolin, silica, corundun, iron oxide III and titanium dioxide.

The paint composition according to the invention is single-component and can be supplied and stored ready-to-use; it is in the form of a water-based emulsion and can be diluted with water to slightly adjust its viscosity before use.

The paint composition according to the invention is formulated so that it does not release more than 5 g/liter, and preferably no more than 2 g/liter, of volatile organic compounds under test conditions of ISO standard 11890-2:2006.

The paint according to the invention can be used as a temporary road paint. Thus, another object of the invention is a process for forming a coating that is detachable with a detachment agent that includes a nonionic surfactant and that has a pH of between 3 and 6, said process being characterized in that a paint according to the invention is applied on a surface, in particular the surface of a road (i.e. a road tar, concrete, cement surface), on a stone or ceramic surface, or on a glass surface (in particular when it is used for horticultural greenhouse shading), which paint forms a coating after drying.

Another object is the use of the paint according to the invention as a temporary road paint, a temporary horticultural greenhouse coating, a removable or renewable wall paint, a removable camouflage coating, a printing ink, a writing ink, a temporary capillary coating, or nail polish.

Another object of the invention is to provide a dissolving agent for said paint that is neither toxic nor harmful to the environment. Said dissolving agent, which is capable of removing and detaching the coating formed by said process after the application and drying thereof, is characterized in that it includes at least 20% by mass of a nonionic surfactant, preferably an alkyl-xyloside in which the alkyl is in C4 to C6, and forms yet another object of the invention.

Advantageously, the pH of the dissolving agent is between 3 and 6. According to the invention, its organic constituents were chosen so that they can be prepared from products of natural origin, and, thus, an embodiment is preferred in which its organic constituents are at least 95% by mass, and preferably at least 98% by mass, of natural origin.

Yet another object is the use of this dissolving agent to remove the coating formed by the aforementioned coating formation process.

A final object of the invention is a kit including the paint according to the invention and the dissolving agent according to the invention, preferably in ready-to-use packagings and in suitable proportions.

DETAILED DESCRIPTION

By "product of natural origin", we mean any plant or animal product that is not of fossil origin, with the understanding that the term "product of fossil origin" means any organic product obtained from petroleum or carbon or petroleum or carbon derivatives. A product of natural origin can be distinguished from a similar product synthesized from raw fossil materials by the methods described in standard ASTM D6866.

By "polydispersity index", we mean the ratio $I_p$ of the weight average molar mass $M_p$ to the number average molar mass $M_n$. The parameters $M_p$, $M_n$ and $I_p$ are obtained after so-called stearic exclusion chromatography of a solution of resin after it has been passed over a gel column.

By "drying power" of an oil, we mean the ability of an oil to dry in the presence of oxygen from the air; this ability increases with the number of unsaturated bonds present in the structure of the oil. Typically, an oil containing monounsaturated fatty acids has a semi-drying character, while an oil containing polyunsaturated fatty acids has a drying character.

By "emulsifying agent" (or "emulsifier"), we mean any product or mixture of products enabling or promoting the formation of an emulsion.

Unless otherwise indicated, the percentages characterizing a composition are mass percentages.

The composition according to the invention comprises an alkyd resin, synthesized from products of natural origin and in particular plant products, and having:

a polydispersity index $I_p$ of between 1 and 20 (preferably between 5 and 15), a weight average molar mass Mp of between 3000 g/mol and 100,000 g/mol (preferably between 3000 g/mol and 70,000 g/mol), an acid index of between 5 and 30, a theoretical average oil length of between 20% and 45%.

Advantageously, its dynamic viscosity measured at 80° C. is between 10 and 50 dPas.

Such a resin can be synthesized by polycondensation of starting products including at least one polyol, at least one polyacid and at least one oil and/or a fatty acid, the oil being chosen from the drying and/or semi-drying plant oils, and the fatty acid being chosen from the fatty acids involved in the composition of said drying and/or semi-drying plant oils. In addition, the polyacid and the polyol are (advantageously) products of natural origin.

These starting products can be dynamically continuously mixed at a temperature advantageously between 180° C. and 220° C. until modified alkyd resin forms.

In particular, the starting products can comprise at least one drying oil chosen from the group consisting of linseed oil, tung oil, oiticica oil, and/or can comprise at least one semi-drying oil chosen from the group consisting of soybean oil, sunflower seed oil, safflower oil, grape seed oil, carnauba palm oil, and calendula oil. All of these oils are products of natural origin.

The fatty acid involved in the composition of a semi-drying oil can advantageously be chosen from the group consisting of oleic acid, linoleic acid and linolenic acid.

The polyacid can advantageously be chosen from plant-based fatty acid oligomers, succinic acid and adipic acid.

In the preparation of the resin, it is possible to control the molar mass and the polydispersity index by adding a chain-blocking catalyst; this catalyst can be a carboxylic polyacid, for example poly(lactic acid), lactic acid or gluconic acid.

These resins are biodegradable and release less than 2 g/l of volatile organic compounds (VOC), determined according to ISO standard 11890-2. They comply with the European Eco-label requirements according to the European Commission Decision 2009/544/EC.

It is possible to prepare an aqueous emulsion of this alkyd resin, for example with an emulsifying agent of fossil origin, or, preferably, of natural origin. A proportion of emulsifying agent of between 1% and 6% by mass (with respect to the total mass of the emulsion) may be suitable. The emulsifying agent can advantageously be chosen from the group consisting of gum arabic, modified starches (in particular starch substituted with an octenyl succinate group), casein, gelatin and $\beta$-cyclodextrin, which are all products of natural origin.

In the context of this invention, it is possible in particular to use the resins and emulsions described in patent applications WO 2011/051612 or FR 2 951 730 (Centre National de la Recherche Scientifique and D.V.I. Lab).

An aqueous resin emulsion of natural origin that can be used in the context of this invention is sold under the name Veomul™ VT 098 by the Belgian company Vandeputte.

According to this invention, the alkyd resin is used in the road paint composition in a proportion of between around 10% and 50% of dry extract, preferably between 10% and 30%, and even more preferably between 10% and 20%. As an example, it is possible to use, for the preparation of the road paint according to the invention, around 15% to 45% by mass, and preferably between 15% and 40%, of an aqueous resin emulsion with a dry extract of around 50% for the preparation of the road paint according to the invention. The dry extract of the emulsion used can, however, be different, for example between 30% and 70% (preferably between 35% and 65%), and can have values of 40%, 45%, 55%, 60% or any intermediate values.

The composition according to the invention also includes proteins of animal origin to ensure better cohesion and adhesion of the paint film, and to regulate its rheology, preferably in a content of between 0.1% and 1.5% by mass. Casein is suitable. A small amount of caustic soda makes it possible to improve the incorporation of proteins (and in particular casein) in the mixture; around 0.1% to 0.2% by mass is sufficient.

The composition also includes a wetting agent, preferably sodium polyphosphate, which ensures good dispersion of the pigments and fillers as well as the stability of the product in a container. A content of between 0.3 and 1.3% by mass is suitable, and preferably between 0.5% and 1%.

Advantageously, the composition also includes an anti-foaming agent of plant origin, for preventing the formation of foam during production and during application of the paint. Its content is preferably between 0.05% and 1.2% by mass. The product known under trade name BYK-1740™ may be suitable.

The composition according to the invention advantageously comprises a biocide, namely a product that has fungicidal and bactericidal activity. It is possible to use a product certified for cosmetic use, which is therefore nontoxic, or a product for paints; to this end, the product known under the trademark Mergal® 723K may be suitable. Typically, a concentration of between 0.05% and 0.5% is used.

The composition according to the invention also comprises mineral fillers and/or pigments. They may have multiple functions such as: opacifying agent, coloring agent, texturizing agent.

The mineral fillers can have a pigment function, in particular white pigment, but it is preferable to add other pigments. In general, the pigments used in the context of this invention are preferably nontoxic mineral pigments. To this end, pigments based on iron or titanium, two nontoxic metals, are preferred. They may be for example $TiO_2$ (white pigment) and/or iron oxide (III), which is a yellow pigment, or other iron-based pigments (red, black), in particular based on iron oxides.

Advantageously, said fillers and pigments are selected from the group consisting of titanium dioxide, iron oxide (yellow, red or black color), kaolin, corundun, calcium carbonate, silica, precipitated silica, sand, alumina, talc, or a mixture of these products.

Advantageously, as a filler, kaolin and/or silica are added, which give the paint body and a certain whiteness. In addition, silica, which is preferably micronized, reinforces the hardness of the paint film. In an advantageous embodiment, both kaolin and silica are used, in mass proportions of between 35:65 and 65:35, and preferably in approximately equal mass proportions.

The mineral fillers can also have an anti-abrasive function, to provide hardness to the paint film, and to prevent wear thereof by friction. To this end, it is possible to use, for example, corundum, preferably in micronized form. The corundum content can, for example, be between 6% and 12% by mass.

Often, temporary road paints are yellow; in this case, yellow iron oxide is advantageously used as a nontoxic mineral pigment. This pigment is used preferably in micronized form. A content of between 3 and 7% by mass is advantageous. If a white color is desired, it is possible to replace the iron oxide with another white mineral powder, for example kaolin, silica or corundum; corundum is preferred if a durable white paint is sought, with the understanding that, in this embodiment in which corundum replaces iron oxide, the total corundum content can therefore be greater than the 12% by mass mentioned above, and specifically around 20%.

It is also possible to add a thickening agent to adapt the rheology of the paint, in particular a cellulose ether, such as hydroxyethylcellulose, to prevent sedimentation of the paint; a content of between 0.1% and 0.5% by mass is generally suitable.

It is also possible to add at least one drying agent, which accelerates the drying of the paint. It can be, for example, a product containing an organometallic salt, preferably based on iron (which is a nontoxic transition metal). It is possible to use, to this end, the product Borchi® Oxy-Coat sold by the OMG Borchers company, in an amount of between 0.4 and 1% by mass.

Finally, the composition comprises water, quantum satis, and typically in an amount of around 15% to 30% by mass, and preferably around 19 to 25% by mass.

An important parameter for the road paint according to the invention is the acid index of the alkyd resin, which must generally be between 5 and 35. More specifically, the acid index must be between 10 and 30 for a temporary paint detachable with a dissolving agent including a nonionic surfactant and having a pH of between 3 and 6, and between 5 and 15 for a permanent paint. If the acid index of the resin used in the temporary road paint is too low, it can no longer be dissolved under acceptable conditions by the dissolving agent.

As an example, it is possible to prepare a temporary road paint with the following composition (in mass percentages):

emulsion of alkyd resin with an oil length of around 40% with a dry extract of 50%: around 36% (corresponding to a total dry alkyd resin extract of the road paint of around 18%);
casein: around 0.5%;
caustic soda: around 0.2%;
plant oil-based anti-foaming agent: around 0.3%;
sodium polyphosphate: around 1%;
fungicidal and bactericidal agent: around 0.3%;
nonionic and/or anionic surfactant: around 0.7%;
mineral fillers: around 38%, including:
around 13% micronized silica,
around 12% kaolin,
around 8% micronized corundum;
around 5% micronized yellow iron oxide pigment;
rheological agent (cellulose ether): around 0.3%;
drying agent (organometallic iron salt): around 0.7%;
water: quantum satis (around 22%).

Such a paint has a dry extract of around 58-60% (determined according to ISO 3251 (110° C., 1 hour)), a density of around 1.21 to 1.23 (determined according to ISO 2811-1, at 23° C.), a VOC content of less than 2 g/liter (determined according to ISO 11890-2), a truncated cone viscosity of between 0.5 and 1 dPas at 25° C. (determined according to ISO 284-1). Its drying according to ATM D 5895 takes around 5 minutes ("dust dry"). A Taber test according to ISO 7784-2 with 40 to 100 mg on a CS 16/17 wheel with a load of 500 g gives a result of at least 500 rotations after one week of drying.

The paint according to the invention can be produced by a dispersion process. In one embodiment, the first step consists of mixing the resin with casein, water and caustic soda, the second phase consists of adding the anti-foaming agent, the wetting agent and the fungicide, and, finally, the fillers and mineral pigments and other additives are added.

The paint according to the invention can be used as a paint for numerous temporary applications. In particular, it can be used as a ground-marking paint for roads, airport zones, supermarkets, as a camouflage paint (in particular for military use), as a decorative paint (in particular in the field of arts and events: cinema, shows, theater, opera), and as a removable or renewable wall paint. It can also be used as a temporary paint for horticultural greenhouses. It can be used in cosmetics, as a temporary capillary coating or as a nail polish. In addition, it can be used as an ink for printing or writing, with the addition of suitable pigments. If needed, its composition can be adapted to these specific uses, and in particular to the modes of application indicated.

As an example, if application by spraying from a distance is indicated (in the case of applying paint on horticultural greenhouses), it is possible to dilute it more with water. For application on horticultural greenhouses, it is unnecessary to use the same mineral fillers, specifically abrasion resistant, used for road application, for which abrasion resistance is essential.

The paint according to the invention can be used as a temporary paint or as a permanent paint. As indicated above, its composition can be adjusted so as to be resistant to abrasion for a substantially long time, and/or to be dissolved more or less easily under the natural conditions, the use conditions and the dissolution conditions envisaged.

The temporary paint according to the invention can be dissolved with a suitable dissolving agent, which includes at least one nonionic surfactant. In an advantageous embodiment, the dissolving agent includes, as a nonionic surfactant, at least one alkyl-xyloside, in an amount of at least 15% by mass and preferably at least 20% by mass. The alkyl radical is preferably in $C_4$, $C_5$ or $C_6$. Butyl-xyloside and in particular amyl-xyloside (CAS no. 444-850-4) is preferred; these alkyl-xylosides can be prepared from biomass, in particular from lignocellulosic sugars.

In an advantageous embodiment, a mixture is used comprising at least one alkyl-glycoside with an alkyl radical in $C_4$, $C_5$ or $C_6$ (at least 20% by mass), and preferably butyl- and/or amyl-xyloside, as well as at least one alkyl-glycoside in $C_8$ to $C_{12}$, in an amount of less than 5% by mass, and preferably decyl-glycosides (CAS no. 58846-77-8). The latter can be obtained by reacting glucose (capable of being obtained from corn starch) with decanol (capable of being obtained from coconut).

The dissolving agent composition can also comprise an α-hydroxy acid, preferably hydroxy-acetic acid (CAS no. 79-14-1), which can also be obtained from natural products (sugarcane, beetroot or grape extracts). The α-hydroxy acid content is advantageously less than 5% by mass.

The dissolving agent composition can also include an alcohol, preferably isopropanol, and its quantity is advantageously less than 5% by mass.

Thus, the dissolving agent according to the invention can be produced so that at least 95%, or even at least 98% by mass of its organic constituents are of natural origin. In addition, the dissolving agent is biodegradable.

The dissolving agent also comprises water, quantum satis. A mass proportion of at least 60%, and preferably at least 70% is preferred. The dissolving agent has a basic character, and its pH can be adjusted by adding, as the case may be, a weak or a strong base (for example, caustic soda, for example in an amount of 0.5% to 2% by mass) or ammoniac. Advantageously the pH of the dissolving agent is between 3 and 6, and even more advantageously between 4 and 6. It is possible to use a lower pH, but this is not advantageous because it is desirable to avoid letting strong acids, even if biodegradable, to escape into the environment.

The dissolving agent can be applied by any suitable technique, for example by aspersion, spraying or with a roller. It is left to act for some time, in particular depending on the temperature (typically one-half hour at 15° C.) in order to enable it to penetrate into the paint, then rinsed with water.

A preferred mode of application of the dissolving agent is performed using a high-pressure cleaning device, at a temperature of at least 50° C., preferably at least 65° C. and even more preferably at least 75° C., with a flat spray nozzle ("razor") at a pressure of at least 30 bars, and preferably at least 50 bars.

The invention claimed is:
1. A temporary paint that is detachable with a detachment agent, said paint comprising:

10 to 50% by mass of an alkyd resin of natural origin in an aqueous emulsion, wherein said alkyd resin has a molar mass of from 3000 g/mol to 100,000 g/mol, a polydispersity index of from 1 to 20, an oil length of from 20 to 40%, and an acid index of from 18 to 35;

at least one of a mineral filler and a pigment; and water;

wherein said detachment agent is a non-ionic surfactant having a pH of from 3 to 6.

2. The paint according to claim 1, wherein the acid index is from 18 to 30.

3. The paint according to claim 1, wherein organic constituents of the paint are present in an amount of at least 97% by mass of natural origin.

4. The paint according to claim 1, wherein organic constituents of the paint are present in an amount of at least 98% by mass of natural origin.

5. The paint according to claim 1, wherein the at least one of a mineral filler and a pigment is present in an amount of from 20% to 60% by mass.

6. The paint according to claim 1, further comprising:
0.1 to 1.5% by mass of an animal protein; and
0.1 to 0.2% by mass of caustic soda.

7. The paint according to claim 6, wherein the animal protein is casein.

8. The paint according to claim 1, wherein the at least one of a mineral filler and pigment is selected from the group consisting of calcium carbonate, kaolin, silica, corundum, iron oxide III, and titanium dioxide.

9. The paint according to claim 1, further comprising at least one member selected from the group consisting of:
0.1 to 1% by mass of a wetting agent;
0.1 to 1% by mass of a thickening agent;
0.1 to 1% by mass of a biocidal agent; and
0.1 to 1% by mass of a drying agent.

10. The paint according to claim 9, wherein the wetting agent is sodium polyphosphate.

11. The paint according to claim 9, wherein the thickening agent is cellulose ether.

12. The paint according to claim 9, wherein the biocidal agent is of plant origin.

13. The paint according to claim 9, wherein the drying agent is an organometallic iron salt.

14. The paint according to claim 1, wherein said paint does not release more than 5 g/liter of volatile organic compounds under test conditions of ISO standard 11890-2:2006.

15. The paint according to claim 1, wherein said paint does not release more than 2 g/liter of volatile organic compounds under test conditions of ISO standard 11890-2:2006.

16. Process for forming a coating that is detachable with a detachment agent that includes a nonionic surfactant and that has a pH of between 3 and 6, said process being characterized in that a paint according to claim 1 is applied on a surface, which paint forms a coating after drying.

* * * * *